G. W. L. HAZEN.
Evaporator.
No. 53,975.
Patented April 17, 1866.
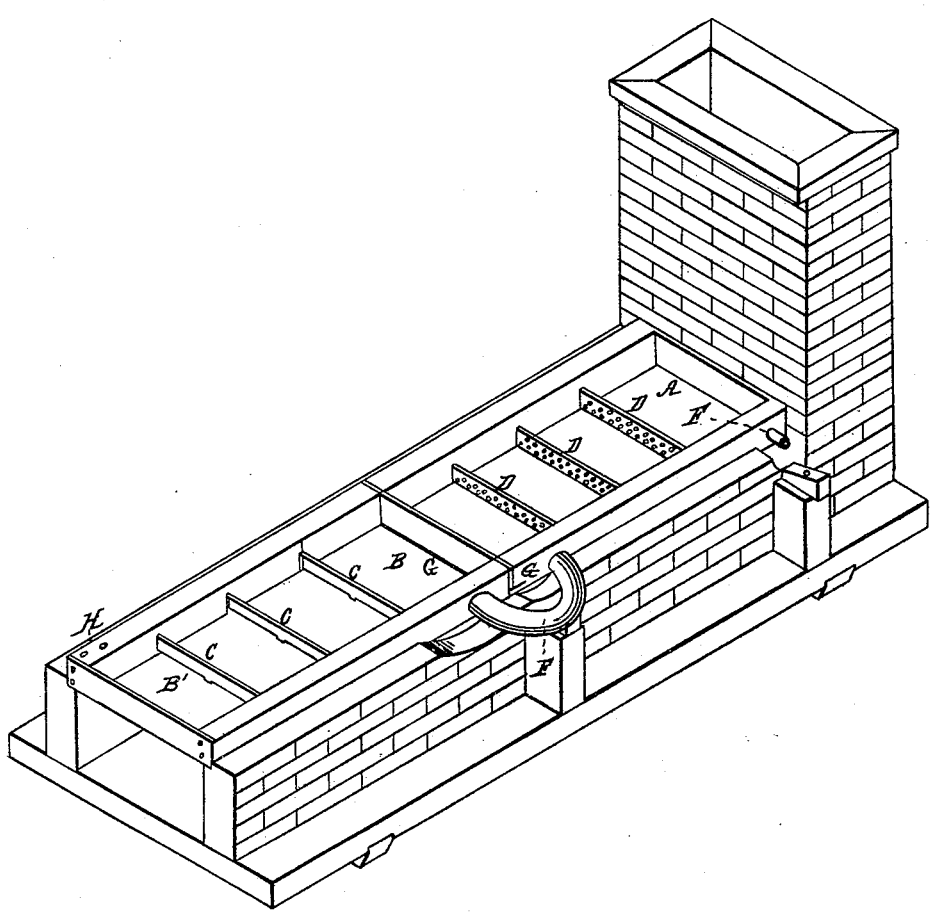

UNITED STATES PATENT OFFICE.

G. W. L. HAZEN, OF FRANKLIN, INDIANA.

IMPROVED EVAPORATOR.

Specification forming part of Letters Patent No. 53,975, dated April 17, 1866.

*To all whom it may concern:*

Be it known that I, G. W. L. HAZEN, of Franklin, in the county of Johnson and State of Indiana, have invented a new and useful Improvement in Apparatus for Boiling and Evaporating the Juice of the Sorghum; and I do hereby declare that the following is a full, clear, and exact description of the same, reference being had to the annexed drawing, made part of this specification, in which my evaporator is presented in perspective.

A and B are two pans, of a few inches only in depth, placed over any suitably-arranged furnace. The fire is under the pan B, and the draft is under the pan A, into the chimney.

In the pan B are shallow bars C. These bars are only about an inch high, and have narrow openings underneath them, as shown in the drawing. The bars extend from side to side, or nearly so, of the pan. There are three of them, though a less number would answer.

At the end of the pan B nearest to A is a pocket, G, made quite shallow, and extending, as represented, under the end of the pan A, though this circumstance is immaterial. The pans are united by a flexible tube, E.

As my improvements relate to the pan B, it is not necessary fully to describe any other part of the apparatus, which is of ordinary construction.

The juice of the cane is introduced through the opening H in the side of the pan, or by any other means which will deliver it below the scum and on the bottom of the pan. This cold juice flows in a thin sheet along the bottom of the pan, and becoming gradually heated as it passes toward the pocket G, this pocket being at the hottest part of the fire, and being very thin, the juice will be there heated to a high degree, and a jet of steam be thrown upward and forward, driving the scum rising upon the surface of the boiling juice, thus impelling it to float on the surface of the return current toward the front of the pan B.

The bars C are made much lower than the sides, so that the scum may flow over them. They are open below to enable the current of cold juice to flow from the front toward the rear, and they are made necessary to prevent the immediate commingling of the sirup.

The depth of the juice in the pan B is regulated by the tube E.

Having fully explained the nature of my improvements, what I claim as my invention, and seek to secure by Letters Patent, is—

1. Constructing the pan of an evaporator with a pocket, G, substantially as and for the purpose set forth.

2. In the pan of an evaporator, the bars C, having narrow openings below them, and made so shallow as compared with the depth of the pan that the scum may flow freely over them, thus establishing counter-currents, substantially as and for the purpose set forth.

In testimony whereof I have signed my name to this specification in the presence of two subscribing witnesses.

G. W. L. HAZEN.

Witnesses:
BERNARDEN PETER,
JAMES F. CARSON.